US006990187B2

(12) United States Patent
MacNamara et al.

(10) Patent No.: US 6,990,187 B2
(45) Date of Patent: Jan. 24, 2006

(54) METHODS FOR BLOCKING REPEATED OCCURRENCES OF NUISANCE CALLS

(75) Inventors: John J MacNamara, Orland Park, IL (US); Steven R Santema, Naperville, IL (US); Randall Joe Wilson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 277 days.

(21) Appl. No.: 10/424,457

(22) Filed: Apr. 25, 2003

(65) Prior Publication Data

US 2004/0213396 A1 Oct. 28, 2004

(51) Int. Cl.
*H04M 3/42* (2006.01)
(52) U.S. Cl. .............................. 379/210.02; 379/88.19
(58) Field of Classification Search ............ 379/88.19, 379/88.2, 196, 210.02
See application file for complete search history.

(56) References Cited

U.S. PATENT DOCUMENTS

| 4,278,844 | A | * | 7/1981 | Jones | .......................... 379/157 |
| 5,388,150 | A | * | 2/1995 | Schneyer et al. | ......... 379/88.19 |
| 5,467,388 | A | * | 11/1995 | Redd et al. | ............ 379/210.02 |
| 5,999,606 | A | * | 12/1999 | Weishut et al. | ............. 379/199 |
| 6,289,084 | B1 | | 9/2001 | Bushnell | ..................... 379/67.1 |
| 6,654,452 | B1 | * | 11/2003 | Murray et al. | ............... 379/197 |
| 6,690,784 | B2 | * | 2/2004 | Renner et al. | ......... 379/210.02 |
| 6,697,473 | B2 | * | 2/2004 | Batten | ........................ 379/199 |
| 6,859,528 | B1 | * | 2/2005 | Welte | .................... 379/210.02 |

OTHER PUBLICATIONS

U.S. Appl. No. 10/858,957, filed Jun. 2, 2004, C. Florkey.

* cited by examiner

*Primary Examiner*—Bing Q. Bui

(57) ABSTRACT

Methods are disclosed for reducing occurrences of nuisance calls. A called party identifies a call as an undesired (or "nuisance") call after answering, screening or reviewing recorded messages of calls. In one embodiment, the called party receives or screens a call and informs a terminating office that it desires to block future calls from the calling party. The terminating office determines the directory number of the calling party and causes the directory number to be added to a blocking database. In another embodiment, a called party reviews one or more prior messages recorded by a messaging system (e.g., answering machine or voicemail system) and flags a message (e.g., message #2) as originating from an undesired caller. The messaging system determines the directory number of the undesired caller and instructs a service provider to add the directory number to a blocking database. Thereafter, in either or both embodiments, the blocking database is consulted upon receiving an incoming call and, if the call is from a directory number in the blocking database, the call is ended or routed to an announcement without ringing the called party phone.

16 Claims, 3 Drawing Sheets

METHODS FOR BLOCKING REPEATED OCCURRENCES OF NUISANCE CALLS

FIELD OF THE INVENTION

This invention relates generally to the field of telecommunication systems and, more particularly, to methods that permit call recipients to reduce occurrences of nuisance calls.

BACKGROUND OF THE INVENTION

Communication systems are well known in which persons (using, for example, wireless or wireline phones) may receive periodic telephone calls from other persons or devices dialing a unique directory number of the called party phone. Far too frequently, these calls are nuisance calls that are undesired by the called party. Examples of nuisance calls include, without limitation, telemarketer calls, incorrectly dialed (i.e., "wrong number") calls, crank calls and perhaps even calls from acquaintances or family members, particularly if they are received too frequently or at inopportune times. Whatever the case may be, most call recipients do not wish to answer nuisance calls, yet if the calls are left unanswered, they are inevitably received over and over again. A related problem is that due to variances in individual recipients, a particular caller may be a nuisance to one recipient but not unwelcome to another. Indeed, even the same recipient may change views of particular callers from time to time, such that caller(s) that were once welcome (or at least not unwelcome) can become a nuisance and vice versa.

A variety of systems have been devised to reduce the inconvenience of nuisance calls. These systems include, among others, call screening and alerting mechanisms. Call screening includes, e.g., use of an answering machine to answer calls, whereby after a series of rings, the caller is prompted to leave a message and the recipient (if present and listening to the message as it is being recorded) may choose to interrupt the message and answer the call (or not). Call alerting includes, e.g., caller identification ("caller ID") services, whereby the phone number of an incoming caller is displayed on the recipient's phone and the recipient, if present, may choose to answer the call (or not). Both call screening and alerting systems offer the recipient an informed basis for choosing to answer (or not answer) the call and in such manner, the recipient may avoid certain nuisance calls. Nevertheless, screening and alerting mechanisms do not prevent repeated occurrences of calls from nuisance callers—each time an incoming call occurs, the recipient is disrupted by a series of rings and must actively listen to a message or observe a caller ID to determine whether to answer the call. Related problems arise in that certain callers may "abandon" calls (i.e., without leaving a message) or caller ID may be blocked or spoofed so that the recipient is unable to determine the source or nature of the call.

Systems for reducing nuisance calls have also been proposed legislatively. In the United States, a national "do-not-call" registry is expected to be implemented beginning in summer 2003 under the auspices of the Federal Trade Commission (FTC). This system is intended to restrict telemarketing calls by imposing fines on telemarketers who call persons registered on the do-not-call list. Similar plans have been enacted in some states. Nevertheless, although the FTC system may reduce telemarketer calls, it will not stop all telemarketer calls because exceptions are granted for certain excepted businesses including, for example, airlines, banks, telephone companies and charities, as well as businesses calling from within the same state. Exceptions are also triggered, allowing a company to call certain persons if those persons have bought, leased or rented anything from the company within the last 18 months; or inquired or applied for something from the company during the past 3 months. Moreover, even when exceptions do not apply, registered persons are not immune from telemarketer calls because the FTC system does not block impermissible telemarketer calls but rather imposes fines when such calls occur. The burden is on the telemarketer to check the registry if it wishes to avoid the fine. Thus, although the FTC system may legally prohibit a portion of telemarketer calls, it does not provide for physically blocking calls of any kind; and in any case, the recipient does not control which callers are legally prohibited.

Another alternative system is described in U.S. Pat. No. 6,289,084 ("the Bushnell patent"), assigned to the assignee of the present invention. The system of the Bushnell patent provides for affording different call treatments to different incoming calls based on the priorities of the respective callers within an affinity database, which is created automatically based on call activity of a customer and optionally, may be manually overrode or supplemented by the customer. Based on the affinity database, for example, calls from high-affinity numbers may be given a distinctive ring; conversely, calls from low-affinity numbers (or numbers not in the affinity database) may be diverted to a messaging system or blocked altogether without answering or messaging of any kind. In such manner, the system of the Bushnell patent may be used to block certain telemarketer and other nuisance calls. However, a problem that arises is that the Bushnell system, if so used to block nuisance calls, would effectively block all first-time callers, infrequent callers as well as unidentifiable calls (i.e., not including caller ID information). Generally, such a result is overkill in that at least a portion of first-time, infrequent or unidentifiable callers, even certain telemarketer calls, might be welcome (or at least not unwelcome) to various recipient(s) depending on individual preferences.

Accordingly, there is a need for methods for reducing occurrences of nuisance calls in a manner that does not block all first-time, infrequent or unidentifiable callers and which allows for individual user discretion of which calls are to be considered nuisance calls. Advantageously, the methods will allow for at least one call (i.e., ring sequence) from a particular caller so as to allow recipients to screen or answer the call, to uniquely determine if and when the caller is a nuisance caller and upon such determination, to block further occurrences of such calls (or optionally, select messaging and/or call treatment options for such calls.)

SUMMARY OF THE INVENTION

This need is addressed and a technical advance is achieved in the art by a feature whereby a called party subscriber of a blocking service can effect blocking of undesired callers after answering, screening or reviewing recorded messages of calls.

In one embodiment, a called party subscriber, responsive to receiving an undesired call from a calling party, sends information to a terminating office indicating its desire to block future calls from the calling party. The information need not include a directory number of the calling party (i.e., the embodiment does not rely on the called party having "caller-ID"). Responsive to the information, the terminating office determines the directory number of the calling party and causes the directory number to be added to a blocking database. Thereafter, upon receiving an incoming call directed to the calling party, the terminating office consults the blocking database to determine if the call is from a blocked directory number and, if so, the terminating office ends the call or routes the call to an announcement without ringing the called party phone.

In another embodiment, a called party subscriber, responsive to reviewing one or more messages, sends information to a messaging system indicating its desire to block future calls from an undesired caller. For example, the subscriber may flag a particular message (e.g., message #2) as originating from an undesired caller and so inform the messaging system. The messaging system determines the directory number of the undesired caller and instructs a service provider to add the directory number to a blocking database. Thereafter, upon receiving an incoming call directed to the calling party, the service provider consults the blocking database to determine if the call is from a blocked directory number and, if so, the service provider provides alternative treatment (e.g., drops the call, routes to an announcement) without ringing the called party phone.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
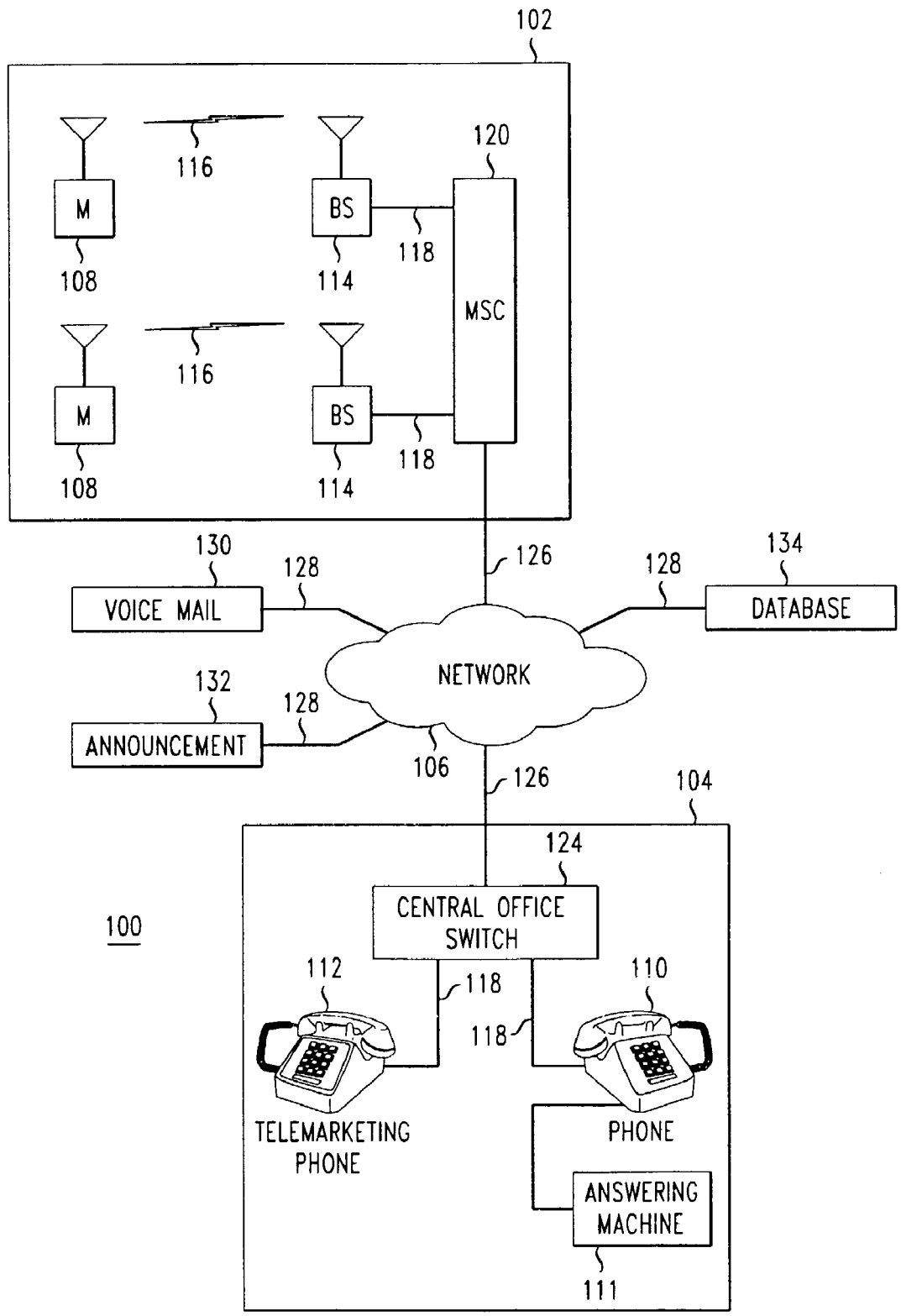
FIG. 1 is a block diagram of a communication system in which embodiments of the present invention may be implemented.

FIG. 1 shows by way of example and not limitation, a communication system 100 comprising a wireless subsystem 102 and a wireline subsystem 104 interconnected by a network 106. The wireless and wireline subsystems 102, 104 may comprise private systems or public systems or a combination thereof. The network 106 may be implemented using any appropriate transmission, switching and routing technologies, as are known in the art, including but not limited to Internet Protocol (IP) and Asynchronous Transfer Mode (ATM) technologies.

Distributed throughout the wireless subsystem 102 is a plurality of mobile units 108 comprising, for example, cell phones, radio units or personal digital assistants (PDAs)) 108. Distributed throughout the wireline system 104 is a plurality of wireline units 110, 112 comprising, for example, telephones, fax machines and the like. For purposes of example, wireline unit 112 is indicated to be a "telemarketing phone," denoting that it is the source of a telemarketing call; and wireline unit 110 is presumed to the recipient of the telemarketing call. A local answering machine 111 may be provided to record/screen incoming calls. Alternatively or additionally, a network-based messaging system 130 may be used to record incoming calls. Generally, as will be appreciated, any of the mobile or wireline units 108, 110 may be the source or recipient of a telemarketing call or other nuisance call. Depending on the call, the source(s) and recipient(s) may each reside in the wireless network 102 or the wireline network 104, or the source(s) and recipients may be divided among the wireless and wireline networks.

Wireless subsystem 102 comprises in one embodiment a digital cellular communication system. The mobile units 108, generally, are adapted to roam between different RF coverage areas of the wireless subsystem, sometimes referred to as "cells" (not shown) served by base stations 114. The wireless subsystem 102 may include multiple base stations 114 serving multiple cells. Wireless calls to (or from) the mobile units 108 are communicated via RF resources 116 from (or to) the base stations, typically by a predefined wireless protocol such as, for example, Global System for Mobile Communications (GSM), Personal Communications Service (PCS), Code Division Multiple Access (CDMA), Time Division Multiple Access (TDMA) or Advanced Mobile Phone Service (AMPS).

The base stations 114 are connected via links 118 to a call processing control entity, commonly known as a mobile switching center (MSC) 120, which routes the calls, as may be appropriate, to or from the network 106 and the wireline subsystem 104. The links 118 may comprise, without limitation, conventional subscriber lines, ISDN lines, Ethernet LAN, and the like. The MSC 120 may comprise, for example, a 5ESS® switching system and adjunct processors, available from Lucent Technologies, Inc. The MSC 120 includes a memory and processor (not shown), for storing and executing software routines for processing and switching calls, for providing various call features to calling parties and for providing access to the network 106 and wireline subsystem 104. The MSC 120 may be configured for operation with generally any suitable circuit, cell, or packet switching technology. In one embodiment, the MSC 120 includes a DTMF receiver (not shown) for recognizing and interpreting dual-tone multi-frequency (DTMF) signals (e.g., #99) entered by wireline units. For example, as will be described in greater detail in relation to FIG. 2, a called party may enter a DTMF signal to indicate a desire to block future calls from a calling party.

Wireline subsystem 104 comprises in one embodiment the public switched telephone network (PSTN). The wireline units 110, 112 of the PSTN are connected via links 118 to a local call processing control entity commonly referred to as a central office switch 124. The links 118 may comprise, without limitation, conventional subscriber lines, ISDN lines, Ethernet LAN, and the like. The central office switch 124 may comprise, for example, a 5ESS® switching system, available from Lucent Technologies, Inc. The central office switch 124 includes a memory and processor (not shown), for storing and executing software routines for processing and switching calls, for providing various call features to wireline units 110 and for providing access to the network 106 and wireless subsystem 102. In one embodiment, the central office switch includes a DTMF receiver (not shown) for recognizing and interpreting dual-tone multi-frequency (DTMF) signals (e.g., #99) entered by wireline units. For example, as will be described in greater detail in relation to FIG. 2, a called party may enter a DTMF signal to indicate a desire to block future calls from a calling party.

As shown, the communication system 100 of FIG. 1 includes a single MSC 120 and single central office switch 124. However, as will be appreciated, the MSC 120 and central office switch 124 are functional entities that may reside in multiple physical switches or combined into a single switch. Links 126 carry signaling information and/or payload information between central office switch 124 and network 106, and/or between MSC 120 and network 106. In one embodiment, the payload information comprises voice information. Alternatively or additionally, the payload information may comprise information associated with video, data, text or generally any communication media. The links 126 are logical links that may be physically realized, without limitation, by conventional subscriber lines, ISDN lines, WAN links, wireless links, and the like.

In one embodiment, data links 128 connect the network 106 to a messaging system 130 (as shown, a voice mail system), an announcement system 132 (i.e., for selecting and playing pre-recorded announcements, as appropriate) and a database 134. In one embodiment, as will be described in greater detail in relation to FIGS. 2–4, the database 134 stores information mapping various wireline or wireline customers to a block list indicating which numbers should be denied or blocked from reaching the customer(s). For convenience, the database 134 is frequently referred to herein as a "blocking database." In one embodiment, the block lists are created for respective customers responsive to the customers entering a particular code (e.g., #99) after receiving a nuisance call. In such manner, the block lists are tailored for individual customers (i.e., each customer uniquely determines and affirmatively selects which calls should be blocked—there is no "automatic" blocking of first-time, infrequent or unidentifiable callers).

The data links 128 may comprise LAN or WAN links or virtually any type of link suitable for transporting voice or data to and from the network 106. As will be appreciated, the messaging system 130, announcement system 132 and database 134 are logical entities that may be realized by unitary, centralized devices or multiple, distributed devices. Moreover, the messaging system 130, announcement system 132 and database 134 may be linked directly to the MSC 120 or central office switch 124 rather than (or in addition to) the network 106.

Figure 2:
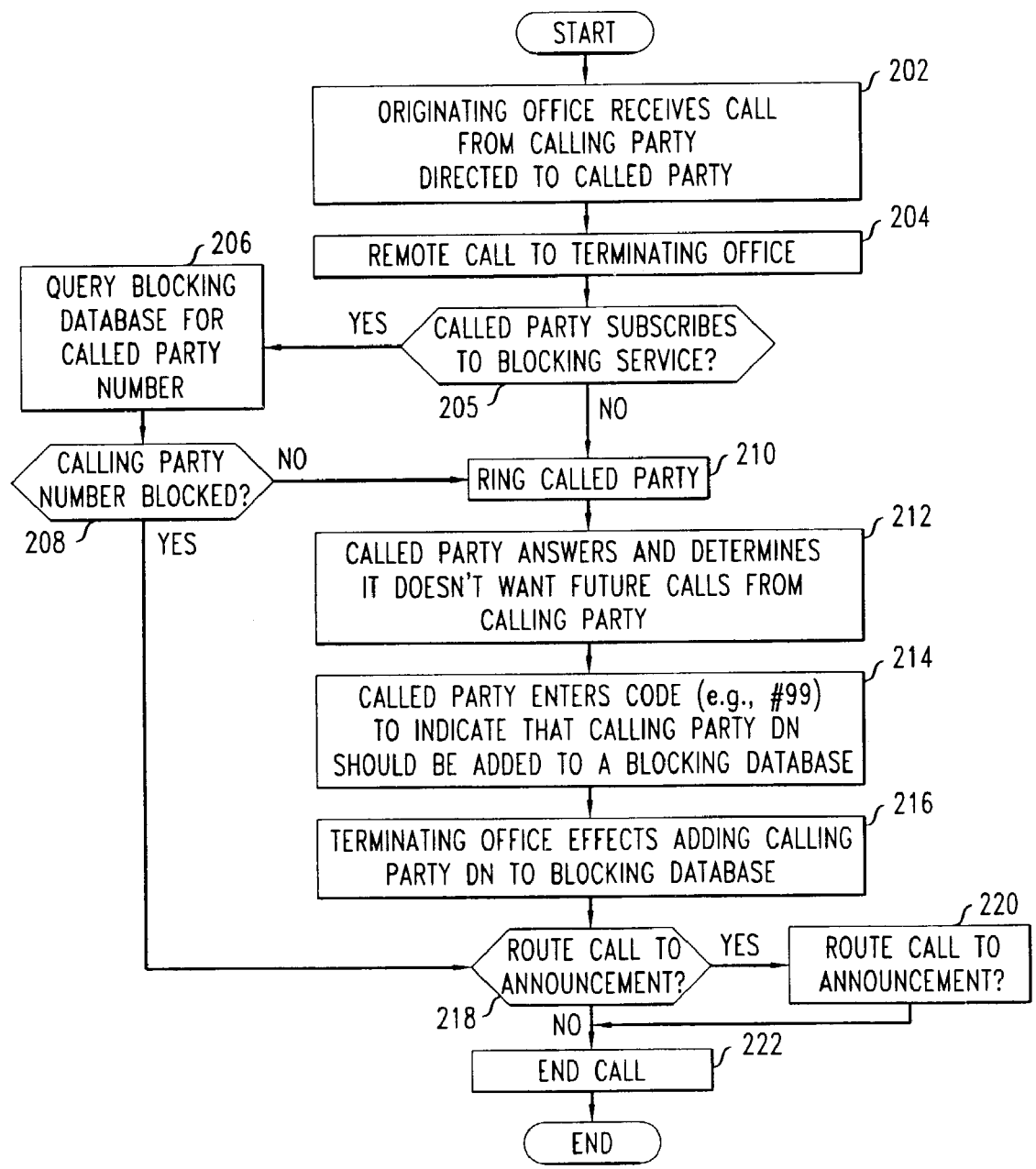
FIG. 2 is a flowchart of a method that allows a called party receiving a nuisance call to block future occurrence of calls from the nuisance caller/number.

Turning now to FIG. 2, there is shown a flowchart of a method that may be implemented in the communication system of the type shown in FIG. 1, for a called party to initiate blocking of a particular unwanted caller/number after receiving a call from the caller/number. In one embodiment, the blocking feature will be made available only to parties having subscribed to (and paid for, as may be applicable) a blocking service. The steps of FIG. 2 are implemented, where applicable, using stored software routines within a called party wireless or wireline phone, MSC 120 and/or central office switch 124. According to preferred embodiments of the present invention, the stored software routines involve periodic querying of the blocking database 134 as well as retrieving information from and/or adding information to the blocking database 134.

The method presumes a calling party dials a directory number of a called party phone, as is well known in the art, to initiate a call to the called party phone. The calling party and the called party may comprise any combination of wireless or wireline phones. At step 202, the originating office (i.e., serving the calling party phone) receives the call from the calling party directed to the called party. At step 204, the originating office routes the call to a terminating office (i.e., serving the called party phone). In one embodiment, step 204 comprises delivering the calling party (source) and called party directory numbers (or other suitable indicia of the parties) from the originating office to the terminating office.

As will be appreciated, depending on the relative locations of the calling party and called party, the originating office and terminating office may be one and the same and in such case, step 204 may be eliminated. For example, referring to FIG. 1, if a call is initiated by the telemarketing phone 112 and directed to wireline unit 110, the central office switch 124 is both an originating and terminating office. Similarly, if the call is invoked entirely within the wireless subsystem 102, the MSC 120 is both an originating and terminating office. More generally, the originating office and terminating office may differ. For example, in the case of a call initiated by telemarketing phone 112 and directed to wireless unit 108, the central office switch 124 is the originating office and MSC 120 is the terminating office. As another example, consider a call initiated by wireless unit 108 and directed to wireline unit 110, in which case the MSC 120 is the originating office and the central office switch 124 is the terminating office.

Once the call is routed to the terminating office, the terminating office checks at step 205 whether the called party is a subscriber to a blocking service. In one embodiment, this comprises checking a database (e.g., database 134) to see whether the called party directory number corresponds to a valid subscriber account. As will be appreciated, the validity status of the account may require subscriber maintaining a particular balance (i.e., in a prepaid service implementation) or having a paid-up balance (i.e., in a post-paid service implementation). For example, an account may be disabled if the subscriber account balance is insufficient or is not paid-up within a designated time.

If the called party is a valid subscriber of the blocking service, the terminating office at step 206 queries the blocking database to see whether a record of blocking numbers exists for the called party/subscriber. In one embodiment, the blocking database contains records identifying various subscriber party/numbers and identifying various directory numbers ("blocking numbers") of calling parties that are to be blocked from calling those numbers. In other words, the blocking database directly associates each subscriber with a number (e.g., zero or more) of blocked calling party/numbers. Hence, in one embodiment, the terminating office at step 206 retrieves the record associated with the subscriber and determines, from the record, zero or more blocking numbers associated with the called party/number.

Figure 3:
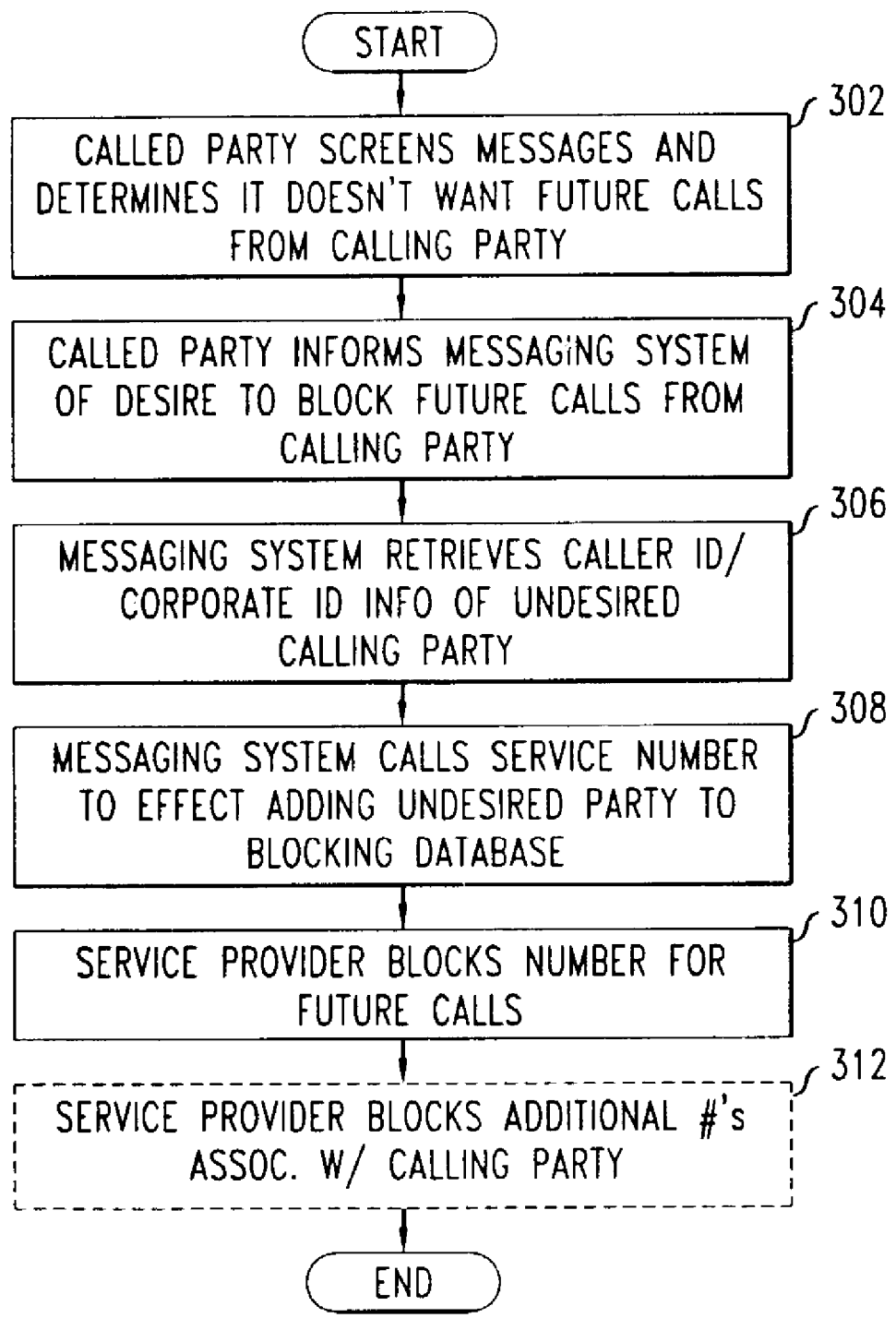
FIG. 3 is a flowchart of a method that allows a called party reviewing a recorded nuisance call to block future occurrence of calls from the nuisance caller/number.

In embodiments of the present invention, a subscriber may select a calling party/number for blocking after receiving a call (described in relation to FIG. 2) or after screening or reviewing a recorded message of a call (described in relation to FIG. 3). In such manner, different customers may uniquely select different numbers for blocking and cause the numbers to be added to the blocking database at various stages of receiving or reviewing a call. Generally, due to variances in individual customers both in terms of blocking opportunities and different tolerances for nuisance calls, the blocking database may be expected to contain different blocking numbers for different customers.

At step 208, the terminating office determines if the calling number is blocked. In the preferred embodiment, the calling number is blocked if it is one of the blocking numbers associated with the called party subscriber identified in blocking database; conversely, the calling number is not blocked if it is not a blocking number associated with the subscriber or if the called party is not a valid subscriber of the blocking service.

If the calling number is not blocked (or if the called party is determined at block 205 to not be a valid subscriber of the blocking service), the terminating office completes the call (e.g., rings the called party phone) at step 210. Typically, the ring signal comprises a predefined sequence of rings (usually at least 3–4 rings) over a time period of several seconds, although the ring signal may be shorter or longer for different users based on network and/or user settings. The called party (or an answering machine, if the called party is screening calls) answers the call at step 212 and the called party determines it doesn't want future calls from the calling party. In other words, the customer wishes to add the calling party/number to the blocking database so as to block further instances of calls from the calling party.

At step 214, the customer enters a code (e.g., #99 on a DTMF keypad) to indicate that the calling party directory number should be added to the blocking database. Alternatively, the customer might request blocking of the calling party by pressing a button, using a point-and-click method or using generally any other appropriate user interface depending on the structure of the customer premise equipment. In one embodiment, customer execution of step 214 does not require the customer to know the particular directory number of the party that is being blocked. Hence, the customer phone need not be equipped with caller ID. Indeed, all that is required is a customer determination to block future calls from the calling party and to enter the appropriate code or signal.

As will be appreciated, execution of step 214 is not necessarily limited to pre-existing subscribers but may also be available to new subscribers, depending on the system implementation. Different or additional keystrokes, buttons, announcements and the like could be used to accommodate either type of customer. For example, consider the case in which the code "#99" is used to request blocking of a particular calling party number. Responsive to the code, the terminating office may check whether the customer is a present subscriber such as described in relation to step 205 and, if so, the code is interpreted as a request to add the calling party number to the list of blocking numbers associated with the subscriber. Continuing the example, if the customer is not a present subscriber, the terminating office may play an announcement describing the blocking service responsive to the "#99 code" and prompting the customer to enter an additional key, button, etc. to accept or refuse the service (e.g., "1" to accept, "2" to refuse). In such case, the "#99, 1" sequence is interpreted as a request to subscribe to the blocking service and to establish the present calling party number as the first blocking number.

In one embodiment, customer execution of step 214 is accomplished during a "live" call. For example, the customer answers the call and, while off-hook, enters a code indicating that the calling party should be added to the blocking database. As another example, the customer screens the call (and hence, the call is received by an answering machine) and the customer enters the blocking code while the live call is still being recorded/played. In another embodiment, customer execution of step 214 may be accomplished after the call from the calling party is ended but before the calling party receives another call. In such manner, the terminating office will be able to determine which calling party the customer desires to block (e.g., the present caller in the case where step 214 is executed during a live call, or the most recent caller in the case where step 214 is executed after the call is ended) without the customer knowing the directory number of the caller.

Alternatively or additionally, in embodiments where the customer is able to determine the directory number or other indicia of the caller and is able to so inform the terminating office, the customer may initiate blocking of that caller/blocker at any time. In still other embodiments, depending on the characteristics of the user interface, the user might also enter supplemental blocking information such as a particular duration of time (e.g., one month) or window of time (e.g., 7:00–9:00pm) for blocking certain calling number(s). Still other embodiments may enable the customer to periodically review existing blocking numbers and amend, delete or add entries as desired.

At step 216, responsive to the customer code/signal, the terminating office determines the directory number of the calling party and adds the calling party directory number to the blocking database. In such manner, the calling party directory number thereafter becomes a blocking number associated with the customer and further instances of calls from the blocking number are blocked from ringing the customer phone. In embodiments where the customer enters supplemental blocking information, the terminating office similarly forwards the supplemental blocking information to the blocking database so that it may be implemented, accordingly, for future calls from the calling number.

As will be appreciated, certain blocking numbers may have a particular duration specified by the customer or may have a pre-provisioned "default" duration. In such case, the blocking numbers will expire or become eligible for removal from the database after the specified duration. In one embodiment, a service provider is responsible for maintaining the blocking database and the service provider requests authorization from the customer in some manner before removing blocking number(s) from the blocking database.

In one embodiment, in addition to blocking the particular directory number of the calling party that sourced the most recent call (i.e., the call that prompted the called party to block future calls), the terminating office determines whether the directory number corresponds to any other directory numbers of the calling party and, if so, the terminating office designates all of the associated directory numbers as blocking numbers. In one embodiment, the terminating office consults a database (e.g., business directory) to determine the existence of additional blocking numbers. The database may be separate from or integrated within the blocking database. For example, the database may comprise a directory of business numbers (e.g., telemarketer numbers), wherein certain businesses may be identified as having several different calling numbers. Thus, for example, if the terminating office determines a first calling number is associated with a particular business, the terminating office may consult the database to determine other directory numbers associated with the business and proceed to block all of the numbers associated with the business. In one embodiment, the terminating office independently blocks all of the additional calling numbers associated with the business (i.e., without requiring additional input from the customer). Optionally, the terminating office may request authorization from the customer in some manner before blocking the additional calling numbers.

After adding the calling number to the blocking database at step 216, or after blocking the calling number at step 208, the terminating office determines at step 218 whether to route the incoming call to an announcement. In one embodiment, the called party code entered at step 214 is interpreted as a request for predefined "default" announcement procedures identified in the blocking database 134 or other subscriber database. In such case, the terminating office at step 218 consults the blocking database to identify the default procedure. Alternatively, the customer may be prompted for announcement preferences on a call-by-call basis after entering the blocking code. Depending on the default procedures or user preferences, the terminating office either routes the call to an announcement at step 220 or ends the call without announcement at step 222.

In one embodiment, in the case where the call is routed to an announcement, the terminating office directs the calling party to the messaging system 132 at step 220 and the messaging system 132 plays an announcement to the caller as appropriate. For example, an announcement may be played to the effect of:

"The party you have called has selected your number for blocking. You are blocked from calling this party in the future."

As will be appreciated, the announcement may be varied as needed or desired by the service provider to accommodate different type(s) of calling parties, languages and so forth, and may be realized in different media (e.g., voice, video or text) depending on the capabilities of the customer premise equipment.

FIG. 3 is a flowchart of a method that may be implemented in the communication system of the type shown in FIG. 1, for a called party to initiate blocking of a particular unwanted caller/number after screening or reviewing a recorded nuisance call. The method presumes a customer uses a messaging system such as an answering machine 111 or centralized voicemail system 130 that offers a calling party the opportunity to leave a recorded message when a call from the calling party is unanswered by the customer, as is well known in the art. The calling party and the called party may comprise any combination of wireless or wireline phones. The steps of FIG. 3 are implemented, where applicable, using stored software routines within a called party customer wireless or wireline phone, messaging system, MSC 120 and/or central office switch 124.

At step 302, the customer reviews the messages on the messaging system (e.g., answering machine 111 or voicemail system 130, as the case may be) and determines that it doesn't want future calls from a particular calling party based on the message received from the calling party. For example, the customer may recognize the call as a telemarketer call and desire to block future calls or messages from the particular telemarketer. At step 304, the customer sends a signal to the messaging system indicating the customer's desire to block the calling party associated with a particular message. In the preferred embodiment, the customer indicates the party to be blocked by "flagging" or identifying which message(s) are associated with the undesired calling party.

As will be appreciated, the manner in which the customer identifies the undesired message (or messages) will generally vary depending on the user interface and/or type of the messaging system used. For example, in the case of an answering machine 111, it is contemplated that the customer may flag the message associated with the undesired caller by entering its message number (e.g., #2 on a DTMF keypad) or, if the answering machine is so equipped, by exercising a special "blocking" button when reviewing the message associated with the undesired caller. In the case of a centralized voicemail system 130, the customer may be prompted during message review to enter a particular key or combination of keys to block a particular caller, for example: "If you wish to select this number for blocking, please press (*B)." Alternatively or additionally, the customer might signal the voicemail system 130 to block a particular caller without prompting from the voicemail system 130. Optionally, depending on the characteristics of the user interface, the customer might also enter supplemental blocking information such as a particular duration of time (e.g., one month) or window of time (e.g., 7:00–9:00pm) for blocking certain calling number(s). Still other embodiments may enable the customer to periodically review existing blocking numbers and amend, delete or add entries as desired.

At step 306, responsive to the customer indicating which message or messages are associated with undesired caller(s), the messaging system determines the directory number of the caller(s). In one embodiment, this step relies upon the messaging system recording caller ID information comprising directory numbers associated with all incoming messages and, when particular message(s) are flagged for blocking, the messaging system retrieves the caller ID information to determine the directory number of the caller associated with those messages. It is not necessary that the caller ID information be displayed or known to the customer. Alternatively or additionally, the messaging system may record and retrieve corporate ID information other than the directory number, if so provided within the caller ID information. This might occur, for example, if telemarketer callers are required to transmit identifying information other than their directory number.

For purposes of example, consider the case of a messaging system having recorded 3 messages ("message 1," "message 2" and "message 3") for a customer. In one embodiment, the messaging system stores directory numbers associated with the respective messages ("DN1," "DN2" and "DN3"). Upon the customer flagging a particular message (e.g., "message 2") as originating from an undesired caller, the messaging system retrieves the corresponding directory number (e.g., "DN2") of the undesired caller. Alternatively or additionally, the messaging system may retrieve corporate ID information associated with message 2, if known. For example, the messaging system may determine that "ABC Company" is the source of message 2.

Having identified a directory number associated with the undesired caller, the messaging system at step 308 calls or sends a message to a service provider to effect adding the directory number to a blocking database. As will be appreciated, this step may be implemented in many possible ways. In one embodiment, for example, the messaging system may call or send a message to the service provider substantially immediately after message(s) are selected for blocking by the customer. In another embodiment, the messaging system may accumulate selected blocking numbers for a period of time (e.g., daily) and call or send a message to the service provider identifying such blocking numbers at a predetermined time (e.g., 3am, so as to minimize interference with other calls). In still another embodiment, the messaging system may accumulate blocking numbers until such time as a threshold number of blocking numbers is identified (e.g., 5) and, upon reaching the threshold number, calling or sending a message to the service provider to report the blocking numbers.

At step 310, after having received the blocking numbers from the messaging system, the service provider adds the indicated number(s) to the blocking database 134. In such manner, the directory number(s) thereafter become blocked from calling the customer number substantially as described in relation to FIG. 2. Optionally, the service provider may first check that the customer is a subscriber to a blocking service, such as described in relation to FIG. 2, step 205, before adding the numbers to the blocking database. If the customer is not a subscriber to the blocking service, the service provider may discard the numbers or may store the numbers to the blocking database under a provisional subscription. For example, the provisional subscription could be converted to a regular subscription, or expire, depending on whether the customer pays a subscription fee within a predetermined time.

At step 312, the service provider may initiate blocking of additional numbers (e.g., common extensions, etc.) associated with the identified directory number(s). In one embodiment, where the messaging system identifies corporate ID information without a directory number, the service provider queries an external database (i.e., separate from the blocking database) to determine directory number(s) associated with the calling party and proceeds to add the identified directory number(s) to the blocking database.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   receiving information indicating a called party, responsive to receiving a call from a calling party, desires to block future calls from the calling party;
   determining a first directory number of the calling party;
   responsive to determining the first directory number, consulting a database to identify at least a second directory number associated with the calling party, the first directory number and the at least a second directory number thereby defining a plurality of blocking numbers associated with the calling party; and
   blocking one or more further occurrences of calls to the called party from any of the plurality of blocking numbers associated with the calling party.

2. The method of claim 1, wherein the step of receiving information comprises receiving a DTMF signal from the called party.

3. The method of claim 2, wherein the step of receiving a DTMF signal comprises receiving the DTMF signal during the call from the calling party.

4. The method of claim 2, wherein the step of receiving a DTMF signal comprises receiving the DTMF signal after the call is ended but before the called party receives another call.

5. The method of claim 1, wherein the step of receiving information comprises receiving a directory number of the calling party from the called party.

6. The method of claim 1, wherein the step of receiving information comprises receiving a desired duration of time for blocking the future calls from the calling party.

7. The method of claim 1, wherein the step of receiving information comprises receiving a desired time window for blocking the future calls from the calling party.

8. The method of claim 1, wherein the step of blocking comprises:
   adding the first directory number and the at least a second directory number to a blocking database, the first directory number and the at least a second directory number thereby defining blocking numbers;
   determining a calling party directory number of at least a first further call directed to the called party;
   consulting the blocking database to determine if the calling party directory number of the first further call is a blocking number; and
   blocking the first further call if the calling party directory number is a blocking number.

9. The method of claim 8, wherein the step of adding blocking numbers to a blocking database includes indicating an association of the blocking numbers with the called party.

10. The method of claim 1, wherein the step of blocking comprises preventing ringing of the called party for one or more further calls from any of the blocking numbers.

11. The method of claim 1, wherein the step of blocking comprises preventing ringing of the called party and directing the calling party to an announcement for one or more further calls from any of the blocking numbers.

12. The method of claim 1, wherein the step of determining a first directory number comprises determining the first directory number is associated with a business:
   the step of consulting a database comprising identifying at least a second directory number associated with the business, the first directory number and the at least a second directory number thereby defining a plurality of blocking numbers associated with the business; and
   the step of blocking comprising blocking one or more further occurrences of calls to the called party from any of the plurality of blocking numbers associated with the business.

13. A method comprising the steps of:
   receiving information indicating a called party, responsive to reviewing one or more caller messages, desires to block future calls from an undesired caller;
   determining a first directory number of the undesired caller;
   responsive to determining the first directory number, consulting a database to identify at least a second directory number associated with the undesired caller, the first directory number and the at least a second directory number thereby defining a plurality of blocking numbers associated with the undesired caller; and
   blocking one or more further occurrences of calls from to the called party from any of the plurality of blocking numbers associated with the undesired caller.

14. The method of claim 13, wherein the step of receiving information comprises receiving, from the called party, by a messaging system having recorded the caller messages, indicia of a message of the one or more messages that is associated with the undesired caller, the message thereby defining a flagged message.

15. The method of claim 14, wherein the step of receiving information comprises receiving, by the messaging system, a message number of the flagged message.

16. The method of claim 14, wherein the step of determining a first directory number comprises retrieving, by the messaging system, a directory number associated with the flagged message.

\* \* \* \* \*